(No Model.)
H. J. SMALL.
LATHE FOR TURNING JOURNALS OF CAR AXLES.
No. 349,908. Patented Sept. 28, 1886.
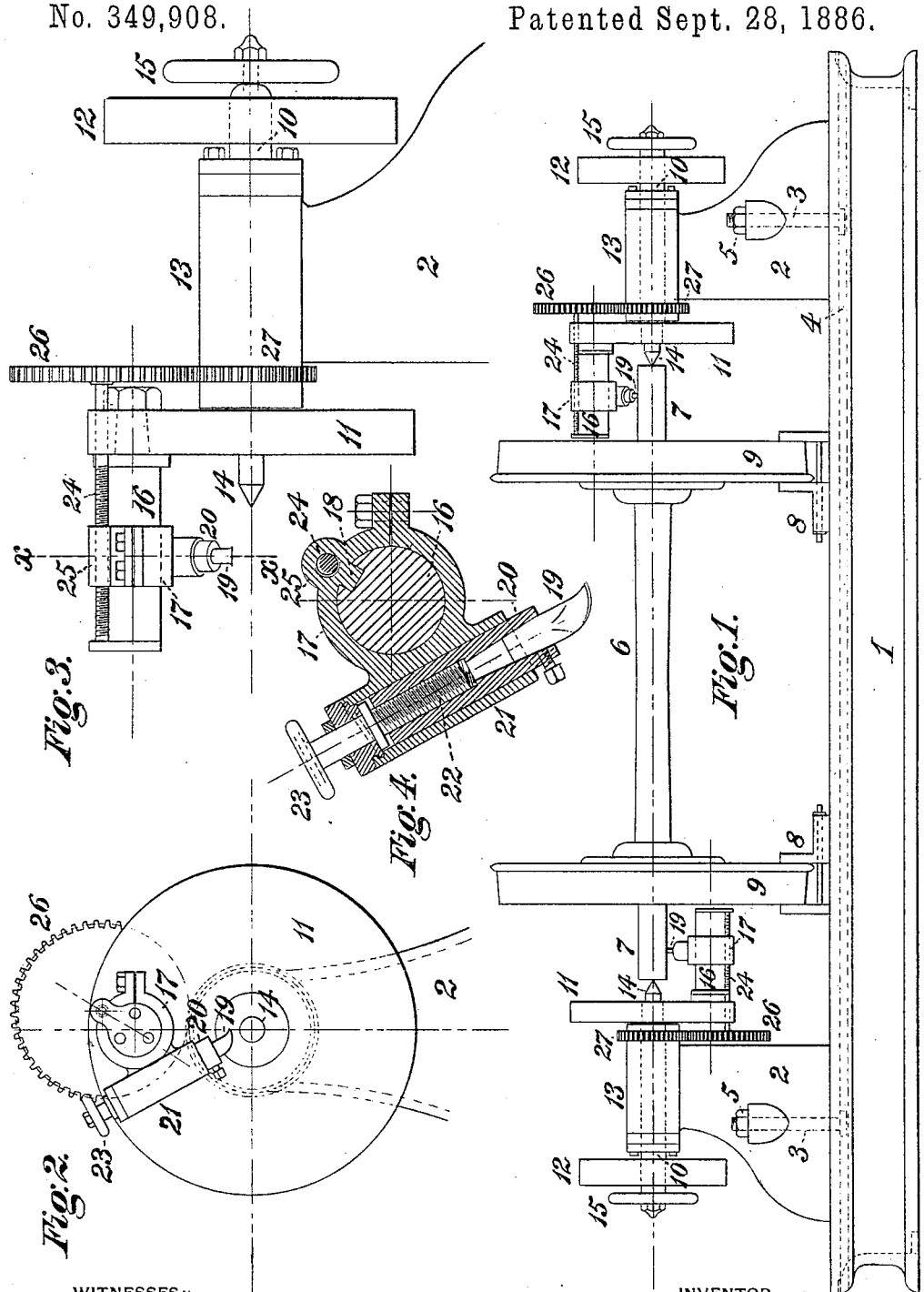
WITNESSES:
C. M. Clarke
R. H. Whittlesey
INVENTOR,
Henry J. Small
by J. Snowden Bell
Att'y.

UNITED STATES PATENT OFFICE.

HENRY J. SMALL, OF BRAINERD, MINNESOTA.

LATHE FOR TURNING JOURNALS OF CAR-AXLES.

SPECIFICATION forming part of Letters Patent No. 349,908, dated September 28, 1886.

Application filed August 7, 1886. Serial No. 210,265. (No model.)

*To all whom it may concern:*

Be it known that I, HENRY J. SMALL, of Brainerd, in the county of Crow Wing and State of Minnesota, have invented certain new and useful Improvements in Lathes for Railroad Axle-Journals, of which improvements the following is a specification.

The object of my invention is to provide a simple and inexpensive lathe for re-dressing railroad axle-journals without removing the wheels therefrom, which will be particularly applicable and useful in the case of axles fitted with wheels of comparatively large diameter, and will serve as a desirable accessory to special tools for wheel-turning, which are not of themselves adapted to turning journals, by enabling the centers to be drilled out and the journals turned up preparatory to placing the wheels in the lathe in which their rims are turned.

To this end my invention, generally stated, consists in the combination, with a head-stock, of a face-plate fixed upon a spindle journaled in the head-stock, a tool-post head fitted to move longitudinally on a tool-carrier bar fixed to the face-plate, a feed-screw journaled on the tool-carrier bar and engaging a nut in the tool-post head, and a gear fixed upon the feed-screw and engaging a stationary gear on the head-stock.

The improvements claimed are hereinafter fully set forth.

In the accompanying drawings, Figure 1 is a side view, in elevation, of a lathe for railroad axle-journals embodying my invention; Fig. 2, an end view, in elevation and on an enlarged scale, of one of the head-stocks; Fig. 3, a side view, in elevation, of the same; and Fig. 4, a transverse section through one of the tool-carrier bars and tool-post heads at the line *x x* of Fig. 3.

In the practice of my invention I provide a substantial bed or base plate, 1, upon which, adjacent to its ends, a pair of head-stocks, 2 2, is secured, with the capacity of longitudinal adjustment, so as to be fixed at a greater or less distance apart, as may be required, to accommodate axles of different lengths. The head-stocks 2 are preferably connected to the bed-plate 1 by bolts 3, passing through lateral lugs on the head-stocks, and having heads which fit in longitudinal slots 4 in the bed-plate, the head-stocks being clamped in adjusted position by nuts 5, engaging the bolts 3, and bearing on the faces of the lugs through which they pass. The axle, 6, whose journals 7 are to be turned is held rigidly to the bed-plate by dogs or clamps 8, engaging the wheels 9, which are fixed upon the axle. A main or driving spindle, 10, having a radial arm or face-plate, 11, secured upon its inner end, and a driving-pulley, 12, on its outer end, is mounted in a bearing, 13, on each of the head-stocks 2, and a center spindle, 14, is fitted removably in the inner end of each of the main spindles 10. The center spindles, 14, are movable longitudinally, so as to be inserted in and withdrawn from the ends of the axle by hand-wheels 15, secured to screws which engage nuts in the center spindles, as in ordinary lathes. A tool-carrier bar, 16, is secured to each of the face-plates 11, parallel with its axis and at such distance therefrom as to enable a tool-post head, 17, which it carries, to rotate clear of the adjacent axle-journal 7. The tool post head 17 is adapted to support a lathe tool or cutter, and is fitted to rotate with and slide longitudinally upon the bar 16 without varying its axial relation thereto, being held in position relatively to the axis of the bar 16 by a key or feather, 18, engaging a longitudinal slot in the bar, or otherwise suitably prevented from rotating independently of the bar. The tool 19 is secured in a tool post or holder, 20, which fits in a lateral socket, 21, and is adjustable toward and from the axis of the spindle 10 and axle 6 by a screw, 22, engaging a nut in the tool-holder 20, and having a hand-wheel, 23, on its outer end, by which it is rotated. A feed-screw, 24, is journaled in bearings on each of the tool-carrier bars 16 and the face-plate 11, to which said bar is attached, the feed-screws 24 engaging nuts 25 on the tool-post heads 17, and imparting, when rotated, longitudinal movement to said heads on their respective bars 16. The feed-screws are rotated through gears 26, secured upon their outer ends and engaging gears 27, fixed upon the head-stocks concentric with the main spindles 10.

In operation the axle 6, with the wheels 9 secured thereon, is placed in the lathe in line with the spindles 10, and secured in position by the clamps 8. If old axles are operated on, the center spindles, 14, are removed, and drills inserted in their place, by which the plugs, if any, are drilled out of the end centers of the axle, or, in the case of new axles, the center holes are drilled. The center spindles are then replaced and forced into the center holes by the rotation of the hand-wheels 15, and the tools 19 are inserted in the tool-post heads 17 and adjusted for the proper cut on the journals 7. Rotation being imparted to the spindles 10, the face-plates 11 carry the tools 19 around the journals and effect the cuts desired thereon, longitudinal feed being imparted to the tool-post heads and tools by the engagement of the gears 26 with the stationary gears 27 in their rotation around the latter. It will be seen that the turning or redressing of the journals can be conveniently and expeditiously effected, both journals being simultaneously acted on, and the necessity of removing the wheels which would exist in the use of an ordinary lathe being obviated.

My improvements are, without change of principle or mode of operation, equally applicable to the turning or truing of locomotive crank-pins without removing the same from their positions in the driving-wheels, the tool-carrier bars and their accessories being in such case preferably mounted upon the quartering-spindles of an ordinary wheel-quartering machine, which perform the function of the driving-spindles above described, the main spindles of the machine serving to maintain the axle truly parallel with the axial lines of the crank-pins operated on.

I claim as my invention and desire to secure by Letters Patent—

1. The combination of a head-stock, a driving-spindle mounted therein, a radial arm or face-plate secured on said spindle, a tool-carrier bar fixed upon the face-plate, a tool-post head fitted to move longitudinally on and rotate with the tool-carrier bar, and a feed-screw journaled on the tool-carrier bar and engaging a nut on the tool post-head, substantially as set forth.

2. The combination of a head-stock, a driving-spindle mounted therein, a radial arm or face-plate secured on said spindle, a tool-carrier bar fixed upon the face-plate, a tool-post head fitted to move longitudinally on and rotate with the tool-carrier bar, a feed-screw journaled on the tool-carrier bar and engaging a nut on the tool-post head, and a gear fixed upon the feed-screw and engaging a stationary gear on the head-stock, substantially as set forth.

3. The combination of a bed-plate, a pair of head-stocks connected adjustably thereto, and a pair of longitudinally-movable tool-post heads each fitted on a bar or support connected parallel with the axis thereof to a spindle mounted in one of said head-stocks, substantially as set forth.

4. The combination of a bed-plate, a pair of head-stocks connected with the capacity of longitudinal movement thereto, a pair of dogs or clamps each adapted to be secured to a car-wheel and connected to the bed-plate between the head-stocks, a pair of spindles mounted in the head-stocks, each having an arm or face-plate fixed upon one of its ends and a driving-pulley on the other, a pair of tool-post heads each fitted to move longitudinally on and rotate with a bar fixed to one of the face-plates, and feed-gearing for imparting longitudinal movement to said tool-post heads, substantially as set forth.

5. The combination of a bed-plate, a pair of head-stocks connected with the capacity of longitudinal adjustment thereto, a pair of adjustable dogs or clamps each adapted to be fixed to a car-wheel and connected to the bed-plate between the head-stocks, a pair of tool-post heads each fitted to move longitudinally on a bar or support connected to a main or driving spindle mounted in one of said head-stocks, and a pair of center spindles each fitted removably in one of said driving-spindles, substantially as set forth.

HENRY J. SMALL.

Witnesses:
B. M. DE LAMBERT,
T. T. BLACKBURN.